United States Patent [19]

Tannascoli et al.

[11] Patent Number: 4,813,531

[45] Date of Patent: Mar. 21, 1989

[54] DEVELOPER TRANSPORT APPARATUS

[75] Inventors: Robert J. Tannascoli; Carl W. Holland, both of Webster, N.Y.

[73] Assignee: Xerox Corporation, Stamford, Conn.

[21] Appl. No.: 166,583

[22] Filed: Mar. 10, 1988

[51] Int. Cl.[4] .............................................. B65G 33/14

[52] U.S. Cl. .................................... 198/671; 198/612; 198/550.1; 239/665; 239/675; 239/689

[58] Field of Search ............... 198/671, 642, 659, 670, 198/650.1, 612, 513; 15/246; 239/123, 658, 659, 665, 667, 671, 675, 679, 681, 683, 687, 689

[56] References Cited

U.S. PATENT DOCUMENTS

| | | | |
|---|---|---|---|
| 1,607,713 | 11/1926 | Wickey | 198/498 |
| 2,728,722 | 12/1955 | Roberts | 198/670 |
| 3,801,286 | 4/1974 | Anolick et al. | 23/285 |
| 4,614,165 | 9/1986 | Folkins et al. | 118/657 |
| 4,658,708 | 4/1987 | Rastoin | 198/659 |
| 4,700,895 | 10/1987 | Takata | 239/689 |
| 4,720,047 | 1/1988 | Knight et al. | 239/675 |

FOREIGN PATENT DOCUMENTS

| | | | |
|---|---|---|---|
| 1027506 | 5/1975 | Canada | 198/659 |
| 0223646 | 5/1987 | European Pat. Off. | 239/689 |
| 2154694 | 5/1973 | Fed. Rep. of Germany | 198/671 |
| 3622738 | 9/1987 | Fed. Rep. of Germany | 198/671 |
| 1044991 | 9/1983 | U.S.S.R. | 198/659 |

*Primary Examiner*—Andres Kashnikow
*Assistant Examiner*—Chris Trainor

[57] ABSTRACT

A developer transport apparatus includes a rotatable auger to transport developer along its length from a developer entry to a developer delivery end and transport means at the delivery end and under the rotatable transport auger to transport developer away from the delivery end with the toner auger being contained within a stationary cylindrical containment tube extending the length of the auger, the tube being cut away at the bottom portion of the delivery end of the auger to permit toner to be delivered to the transport. The developer auger has an antibridging device at its delivery end which is a flexible paddle wheel mounted through the shaft of the auger and rotatable therewith. The flexible paddle wheel has a length grater than the diameter of the containment tube whereby upon rotation of the auger the paddle wheel is first deformed by the top portion of the containment tube at the delivery end of the auger with the storage of energy therein and the subsequent release of energy when the deformed paddle is rotated through the cut away portion of the containment tube. In a preferred embodiment the paddle wheel is made of two thin solid planar members in abutment and offset axially to each other such that on rotation the leading edge is the longer of the two members.

7 Claims, 6 Drawing Sheets

FIG. 3A
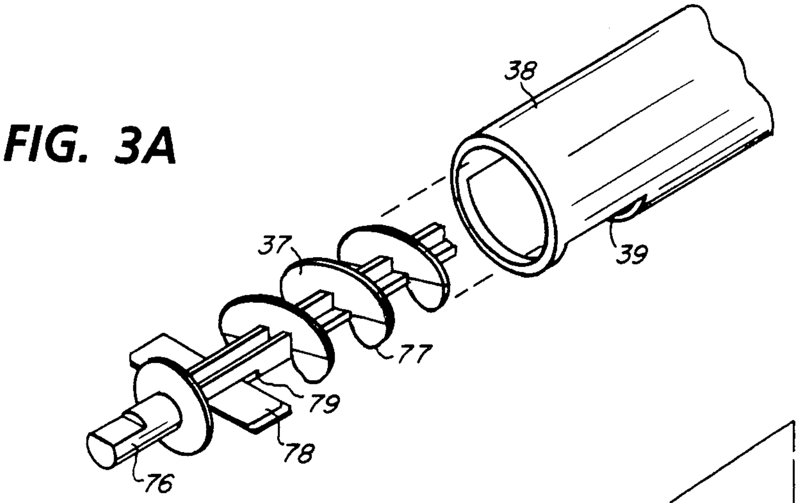
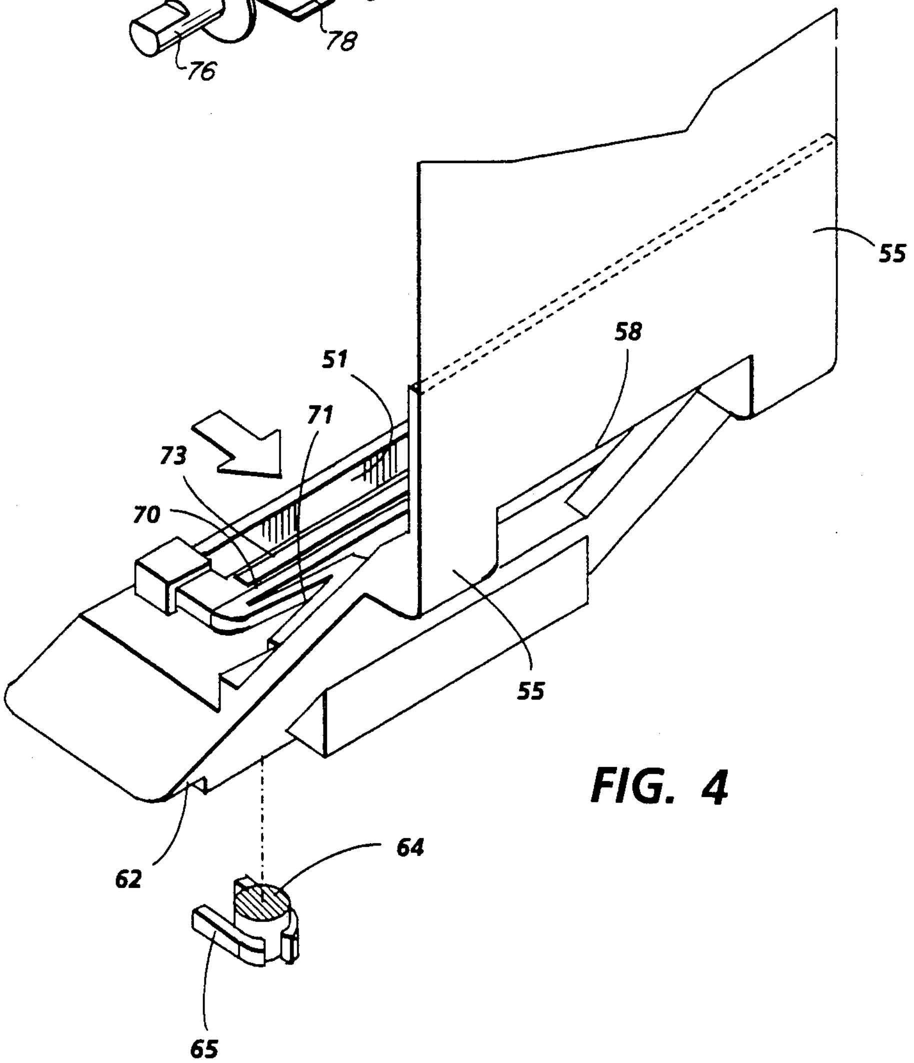
FIG. 4

DEVELOPER TRANSPORT APPARATUS

CROSS REFERENCE TO RELATED APPLICATIONS

Reference is hereby made to copending application Ser. No. 166,584 entitled "Developer Apparatus with Removable Developer Waste Sump" and filed concurrently herewith in the name of Stephen D. Cipolla et al. and filed concurrently herewith.

BACKGROUND OF THE INVENTION

The present invention relates to developer apparatus for electrostatographic printing machines and more particularly to a removable developer.

In an electrostatographic reproducing apparatus commonly in use today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image area contained within the usual document. Subsequently, the electrostatic latent image on the photoconductive insulating surface is made visible by developing the image with developing powder referred to in the art as toner. Most development systems employ a developer material which comprises both charged carrier particles and charged toner particles which triboelectrically adhere to the carrier particles. During development the toner particles are attracted from the carrier particles by the charge pattern of the image areas in the photoconductive insulating are to form a powder image on the photoconductive area. This image may subsequently be transferred to a support surface such as copy paper to which it may be permanently affixed by heating or by the application of pressure. Following transfer of the toner image to a support surface, the photoconductive insulating member is cleaned of any residual toner that may remain thereon in preparation for the next imaging cycle.

In typical commercial applications of such apparatus, the developer material has a limited useful life. By developer material herein, it is intended to define the combination of toner and carrier as the developer. As the developer material is used, toner naturally has to be replenished in the mixture of carrier and toner to insure adequate supply of toner for the development process. In addition, the carrier itself has a limited life due to a variety of problems occurring with continued use. For example, the carrier may become impacted with toner thereby reducing or altering its triboelectric properties particularly with respect to the toner. In addition, it frequently happens that the individual carrier particles are coated with selected material to enhance the triboelectric properties and these coatings after prolonged use can deteriorate or indeed flake off. As the end of the useful life of the developer material approaches and then the quality of the copies being produced in the printing machine degrades. As the quality of copies produced degrades, the users become displeased resulting in the necessity of a service call by a trained technician to try to improve copy quality. In addition, when the developer material finally does fail, a service call by a trained technician is required to replace the developer material in the apparatus. Accordingly, it is desirable to be able to use developer material throughout the useful life of the electrostatographic machine.

PRIOR ART

Recently, an apparatus and method for providing an extended life development system have been described in U.S. Pat. No. 4,614,165 to Folkins et al. The developing process described therein involves the addition of both toner particles and carrier particles to the developer in the developer housing to insure that the usable life of the developer material in the chamber at any point in time is at least equal to the life of the electrophotographic printing machine. To accommodate the addition of further carrier and toner material, waste or spent developer is removed from the developer housing when it exceeds a pre-determined quantity. The mixture of toner particles and carrier particles added to the developer housing has ratio of toner particles to carrier particles substantially greater than the ratio of toner particles to carrier particles in the developer housing. To facilitate collection and discharge of extraneous developer material, a waste container 70 is provided in FIG. 2 which may be periodically emptied by the machine operator.

In the above referenced copending application Ser. No. 166,584 filed 3-10-88, a developer system is illustrated for implementing the extended life development concept of U.S. Pat. No. 4,614,165. Therein is described a development system which includes a plurality of transport augers to transport developer auger through various aspects or portions of the development system. Typically, these auger systems transport developer along the length of the auger delivering it to an end wherein the developer falls by gravity to a second transport auger which transports the developer along its length to an end where again the developer falls by gravity. In implementing such a developer transport system, the developer material has been found to exhibit a tendency to bridge at the transition between any two transport augers. Gravity alone and the positive pressure created by the auger to transport the developer have not consistently been proven reliable in overcoming this bridging tendency. Accordingly, there is a need and desire to provide a simple, inexpensive mechanism for avoiding this developer bridging tendency.

SUMMARY OF THE INVENTION

In accordance with a principle aspect of the present invention, a developer transport apparatus is provided comprising a rotatable developer auger to transport developer along its length from a developer entry to a developer delivery end and a transport means at the delivery end and underneath the auger to transport developer away from the developer delivery end, the developer auger being contained within a stationary cylindrical containment tube extending the length of the auger and the tube being cut away at the bottom portion of the delivery end of the auger to permit developer to be delivered to the transport means, the auger having a developer anti-bridging device at its delivery end comprising a flexible paddle wheel mounted to the shaft of the auger and rotatable therewith, the flexible paddle wheel having a length greater than the diameter of the containment tube whereby upon rotation of the developer auger the paddle wheel is initially deformed by the top portion of the containment tube at the delivery end of the auger with the storage of energy therein and the subsequent release of energy when the deformed wheel is rotated to the cut-away portion of the containment tube.

In a further aspect of the present invention the paddle wheel is made from two thin solid deformable planar members in abutment and offset axially relative to each other such that on rotation the leading edge is the longer of the two members.

In a further aspect of the present invention, each of the planar members are about 5 mils thick.

In a further aspect of the present invention, the planar members are fixedly mounted through a slot in the shaft of the developer auger.

In a further aspect of the present invention, the developer auger and the second rotatable auger intersect at about right angles.

Other features of the present invention will become apparent as the following description proceeds and upon reference to the drawings.

FIG. **3*a*** is an enlarged exploded isometric view of the delivery end of the developer auger having the developer anti-bridging device attached thereto.

FIG. 4 is an enlarged isometric view of the developer waste sump when it is mounted in the developer assembly.

Figure 5:
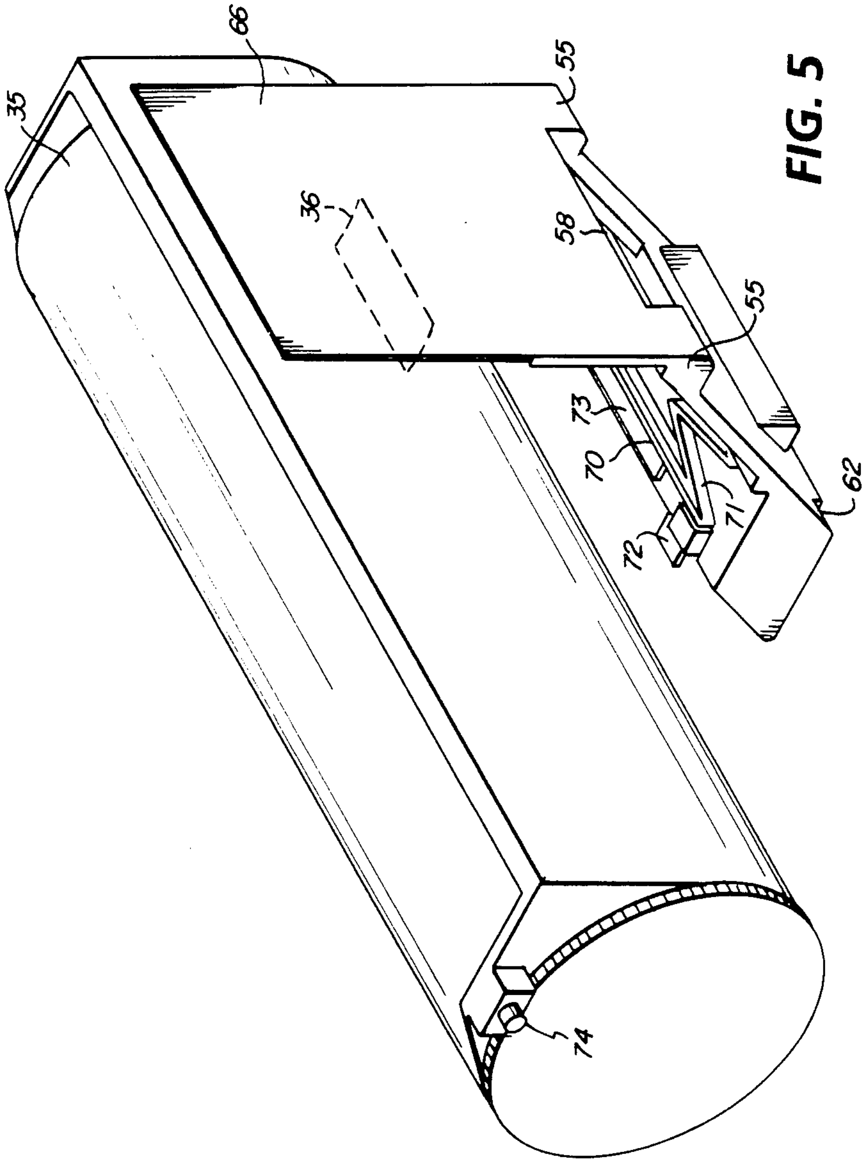

FIG. 5 is an isometric view of the removable developer supply container tethered to the removable developer waste sump.

Figure 6:
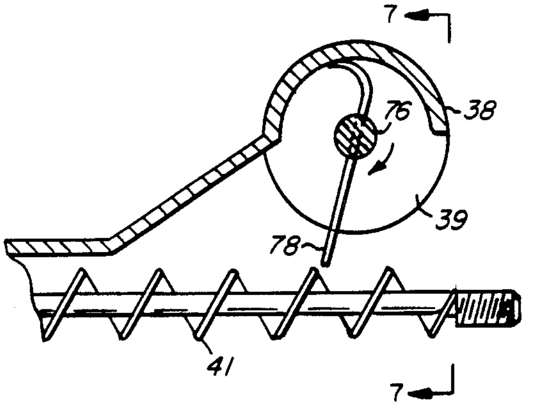

FIG. 6 is a schematic representation in cross section of the delivery end of the developer auger and second developer transport auger.

Figure 7:
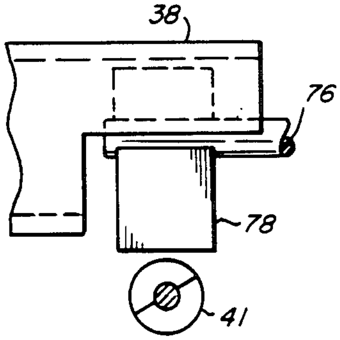

FIG. 7 is a view taken along the line 7—7 of FIG. 6.

Figure 8:
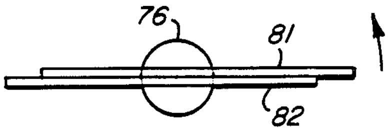

FIG. 8 is schematic representation in cross section of a preferred paddle wheel configuration.

Figure 9:
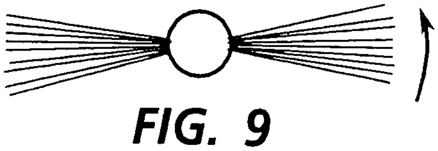

FIG. 9 is an alternative embodiment of the paddle wheel having a brush configuration.

DESCRIPTION OF THE PREFERRED EMBODIMENT

The invention will now be described with reference to a preferred embodiment of the developer transport apparatus in an electrostatographic printing apparatus.

Figure 1:
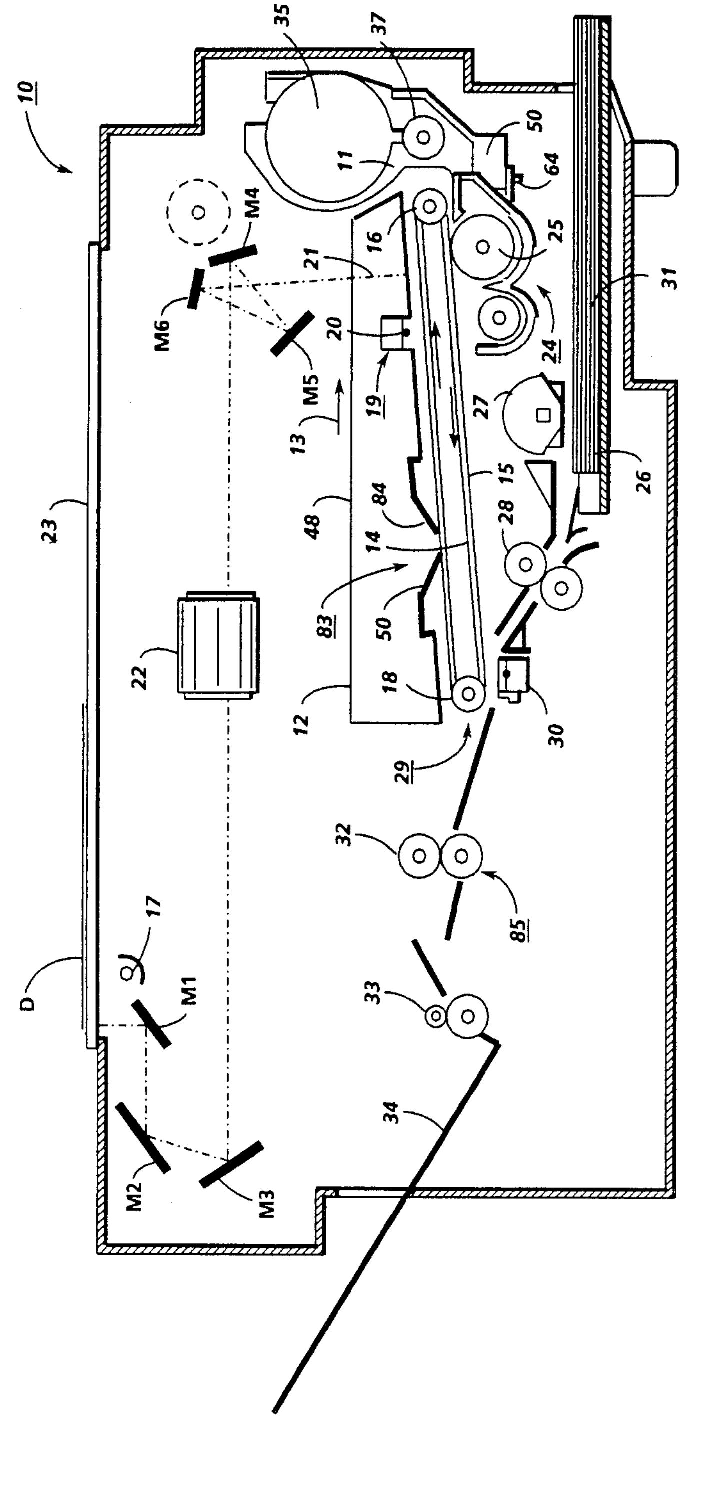
FIG. 1 is a schematic representation in cross section of an automatic electrostatic reproducing machine with the developer transport apparatus according to the present invention.

Referring now to FIG. 1, there is shown by way of example, an automatic electrostatographic reproducing machine 10 which includes a removable processing cartridge employing the developer transport apparatus removable waste sump according to the present invention. The reproducing machine depicted in FIG. 1 illustrates the various components utilized therein for producing copies from an original document. Although the apparatus of the present invention is particularly well adapted for use in automatic electrostatographic reproducing machines, it should become evident from the following description that it is equally well suited for use in a wide variety of processing systems including other electrostatographic systems and is not necessarily limited in application to the particular embodiment or embodiments shown herein.

The reproducing machine 10 illustrated in FIG. 1 employs a removable processing cartridge 12 which may be inserted and withdrawn from the main machine frame in the direction of arrow 13. Cartridge 12 includes an image recording belt like member 14 the outer periphery of which is coated with a suitable photoconductive material 15. The belt is suitably mounted for revolution within the cartridge about driven transport roll 16, around idler roll 18 and travels in the direction indicated by the arrows on the inner run of the belt to bring the image bearing surface thereon past the plurality of xerographic processing stations. Suitable drive means such as a motor, not shown, are provided to power and coordinate the motion of the various cooperating machine components whereby a faithful reproduction of the original input scene information is recorded upon a sheet of final support material 31, such as paper or the like.

Initially, the belt 14 moves the photoconductive surface 15 through a charging station 19 wherein the belt is uniformly charged with an electrostatic charge placed on the photoconductive surface by charge corotron 20 in known manner preparatory to imaging. Thereafter, the belt 14 is driven to exposure station 21 wherein the charged photoconductive surface 15 is exposed to the light image of the original input scene information, whereby the charge is selectively dissipated in the light exposed regions to record the original input scene in the form of electrostatic latent image.

The optical arrangement creating the latent image comprises a scanning optical system with lamp 17 and mirrors $M_1$, $M_2$, $M_3$ mounted to a a scanning carriage (not shown) to scan the original document D on the imaging platen 23, lens 22 and mirrors $M_4$, $M_5$, $M_6$ to transmit the image to the photoconductive belt in known manner. The speed of the scanning carriage and the speed of the photoconductive belt are synchronized to provide faithful reproduction of the original document. After exposure of belt 14 the electrostatic latent image recorded on the photoconductive surface 15 is transported to development station 24, wherein developer is applied to the photoconductive surface 15 of the belt 14 rendering the latent image visible. The development station includes a magnetic brush development system including developer roll 25 utilizing a magnetizable developer mix having course magnetic carrier granules and toner colorant particles as will be discussed in greater detail hereinafter.

Sheets 31 of the final support material are supported in a stack arranged on elevated stack support tray 26. With the stack at its elevated position, the sheet separator segmented feed roll 27 feeds individual sheets therefrom to the registration pinch roll pair 28. The sheet is then forwarded to the transfer station 29 in proper registration with the image on the belt and the developed image on the photoconductive surface 15 is brought into contact with the sheet 31 of final support material within the transfer station 29 and the toner image is transferred from the photoconductive surface 15 to the contacting side of the final support sheet 31 by means of transfer corotron 30. Following transfer of the image, the final support material which may be paper, plastic, etc., as desired, is separated from the belt by the beam strength of the support material 31 as it passes around the idler roll 18, and the sheet containing the toner image thereon is advanced to fixing station 85 wherein roll fuser 32 fixes the transferred powder image thereto. After fusing the toner image to the copy sheet the sheet 31 is advanced by output rolls 33 to sheet stacking tray 34.

Although a preponderance of toner powder is transferred to the final support material 31, invariably some residual toner remains on the photoconductive surface 15 after the transfer of the toner powder image to the final support material. The residual toner particles remaining on the photoconductive surface after the transfer operation are removed from the belt 14 by the cleaning station 83 which comprises a cleaning blade 84 in scrapping contact with the outer periphery of the belt 14 and contained within cleaning housing 48 which has a cleaning seal 50 associated with the upstream opening of the cleaning housing.

Alternatively, the toner particles may be mechanically cleaned from the photoconductive surface by a cleaning brush as is well known in the art.

It is believed that the foregoing general description is sufficient for the purposes of the present application to illustrate the general operation of an automatic xerographic copier 10 which can embody the apparatus in accordance with the present invention.

Figure 2:
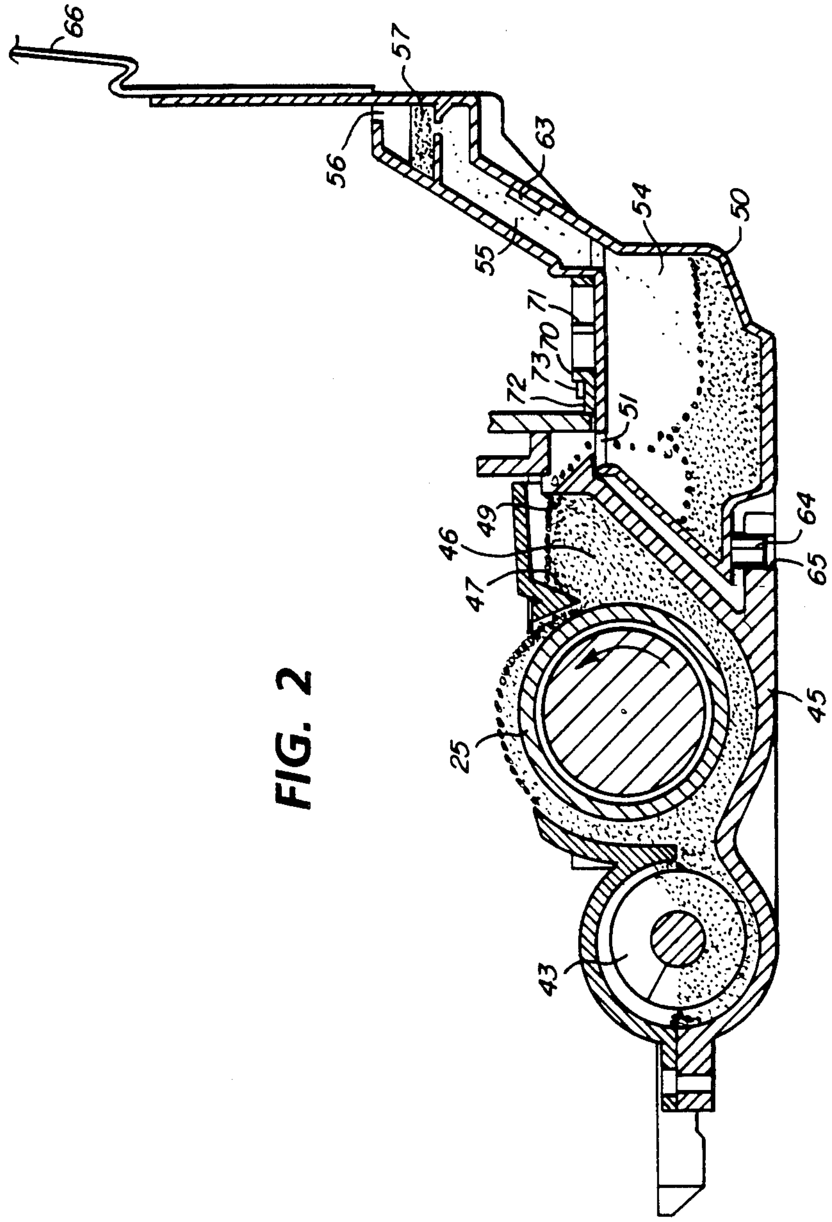
FIG. 2 is an enlarged schematic representation in cross section of a developer assembly.
Figure 3:
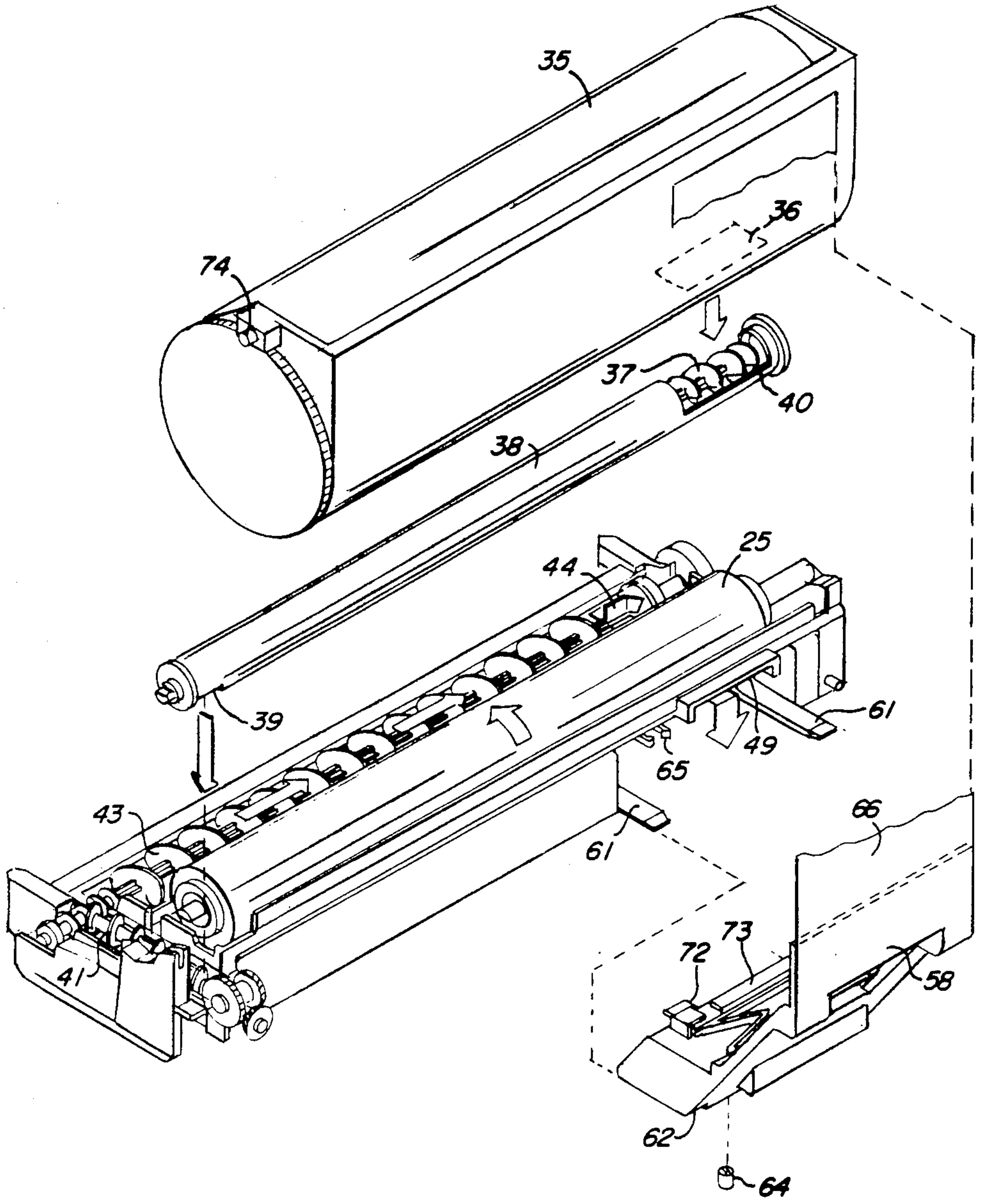
FIG. 3 is a partially exploded isometric view of the developer assembly illustrating the auger transport system together with a removable developer supply container, and a removable developer waste sump tethered to the supply container.

The operation of the developer assembly 11 will be described with continued reference to FIG. 1 and additional reference to FIGS. 2 and 3. Initially, it should be observed that the developer assembly is itself removable from the main of the machine in the direction of the arrow 13 and includes a removable developer supply or replenisher container 35, developer roll 25, removable developer waste sump 50 as well as associated transport augers 37, 41 and developer mix auger 43. It will of course be appreciated that while FIG. 3 illustrates transport auger 41 and developer mix auger 43 to be opened to the air that they are in use covered by cover members, not shown for purposes of illustration, to reduce contamination in the machine.

The developer supply or replenisher container 35 includes a developer dispensing opening 36 in the bottom thereof which when it is inserted into the developer assembly is in developer dispensing communication with an opening 40 in containment tube 38 of first developer transport auger 37. The developer supply container is inserted into the developer assembly manually and rotated counterclockwise to seat therein about locating pins 74 on each side of the container. Simultaneous with rotation of the container, a door, not shown, over the dispensing opening 36 is opened to release the developer contained therein. A dispensing opening 39 is provided at the downstream or delivery end of the first transport auger 37 to dispense developer to second transport auger 41 under auger 37 which in turn transports developer to the front of the developer assembly dropping down into the developer mix auger which mixes and transport the developer and because of its increased rotational speed provides preliminary charging of the developer. The developer is then transported longitudinally to the opposite end of the developer mix auger at which time it is urged by paddles of paddle wheel 44 through a small door in the back wall (not shown) into the developer sump 46 in the developer housing. A magnetic brush developer roll 25 is rotatably mounted therein by means not shown to deliver charged developer from the sump 46 to the electrostatic latent image on the photoconductive surface of the belt. In the developer housing 45 the thickness of the developer on the developer roll 25 is trimmed by trim bar 47 prior to its entering the development zone wherein it is brought into contact with the image on the photoconductive insulating layer and subsequently returned to the developer sump 46. The developer in the sump 46 is now transported by angled flutes not shown in the bottom of the sump back to the entrance portion of the developer mix auger. A small blade portion (not shown) is provided at the developer entrance portion of the developer in auger in the developer sump to direct partially used developer from the developer roll and mix it with new developer as it is being added to the developer mix auger thereby recirculating partially used developer with new developer in the system.

As new developer is continuously added to the developer system some material needs to be removed when the capacity of the system is reached. This is enabled through a developer exit port 49 in the upper portion of the rear of the developer sump 46 in the developer housing 45. Thus, as new developer is added, some new and indeed some old developer material flows or trickles through the developer exit port 49. Removably positioned and releasably secured to the rear of the developer housing is the developer waste sump 50 which has an opening 51 in communication with developer exit port 49 to receive spent or waste developer in the developer storage chamber 54. The developer waste sump 50 includes at least one settling chimney 55 to enable entrained toner to be removed from the air prior to exhaust and works in cooperation with filter 57 such as a polyurethane foam for that purpose prior to the air exiting the exhaust port 56. Alternatively or in addition thereto a magnet 63 may be placed in the settling chimney to attract the magnetically attractable carrier and toner particles to assist in separating them from the exhaust air. As illustrated in FIGS. 3 to 5, the developer waste sump may include two such settling chimneys 55 connected at the top portion by a member 58 forming a positioning handling for the developer waste sump. With continued reference to FIGS. 3 through 5, the placement of the developer waste sump 50 into the developer assembly will be described in greater detail. The developer waste sump 50 may be inserted manually by the operator holding handle 58 and inserting the waste sump into the cavity formed behind the developer sump 46 in the developer assembly so that the developer exit port 49 on the developer assembly is in communication with opening 51 in the developer waste sump. As the developer waste sump slides into position on runners 61 which slidably engage grooves 62 on opposite side of the waste sump, the tabs 72 of spring 71 engage the developer assembly compressing the spring and forcing the door 70 attached thereto to move rearwardly exposing opening 51 in the top of the developer waste sump. At the same time, at the bottom of the developer waste sump a small pin 64 mounted thereto is engaged by fastening means 65 on the developer assembly 11. Optionally, foam seals such as strips of closed or open celled foam may be placed around the opening 51 or the exit port 49 or both to prevent particulate material from escaping onto the machine. A further option is to provide a magnet 73 on the door 70 extending between tabs 72 to create a magnetic field which will prevent the flow of developer from the door area in the event there is a slight gap between the door and the sump body.

The developer waste sump 50 is connected to the developer supply or replenisher container 35 by means of a tether member 66 which is desirably a fexible plastic material. This arrangement ensures that the developer waste sump will be replaced whenever a developer replenisher supply is provided to the developer housing. Additionally, this has the advantage in that an instruction label may be placed on the tether member to instruct the user how to properly insert both the developer supply or replenisher container as well as the developer waste sump.

The described combination of developer waste sump with developer supply container and development apparatus enables the extended life development system of U.S. Pat. No. 4,614,165 wherein a small quantity of two-component developer controlled by the dispense rate of the system is added into the recirculating supply of developer material in the developer assembly while a small quantity of used developer is removed from the developer sump. The developer mixture in the new developer supply container should be at least 25% by weight carrier to obtain extended life performance. Developer mixture containing up to 50% by weight carrier and 50% by weight toner are also functional.

The developer anti-bridging device of the present invention will be described with reference to FIGS. 3*a* and 6, 7 and 8. The anti-bridging device comprises a paddle wheel 78 fixedly mounted in a slot 79 on the shaft 76 of first developer transport auger 37. The length of the flexible paddle wheel is greater than the diameter of the containment tube 38 and the two ends of the paddle wheel 78 are each longer than the radius of the inside diameter of the containment tube 38. This enables both ends of the paddle wheel to extend down into the space between the delivery end of the developer auger and the take-away auger 41 to ensure that there is no bridging of developer. Furthermore, the longer length of the flexible paddle wheel together with the associated deformation that is provided upon rotation with the developer auger enables the storage of energy in the paddle wheel which is subsequently used to provide a shock force to the delivery end of the auger when it rotates through the cut-away dispensing opening 39 at the delivery end of the auger to shake the developer lose. Accordingly, this paddle wheel is a device which ensures a positive transport from one auger to another auger and provides a slight impact to the transport auger to help remove any bridged or clogged developer from it.

The paddle wheel may be made of any suitable material. Selected materials will in addition to being flexible exhibit good fatigue resistance and creep resistance since they must be capable of being maintained in a deformed state for a considerable period of time when the transport system is not being used and be capable of immediately recovering from the deformed state. In addition, the longer the paddle the greater the deformation will be, the higher the stored energy the greater the impact and area of sweep when the paddle is unconstrained by the containment tube. However, as the length of the paddle is increased, the fatigue stress is increased also resulting in an eventual reduction in life. Accordingly, appropriate balance is maintained between the length of the paddle wheel and the impact force when the paddle wheel is unconstrained. Typical materials include polyester films such as Mylar available from E. I. DuPont deNemours, Inc., commercially available nylon and acetal resins such as Delrin also available from E. I. DuPont deNemours, Inc. In a typical embodiment the paddle wheel will be about 28 millimeters in length and the internal diameter of the containment tube will be about 18.5 millimeters. A particularly preferred embodiment of the paddle wheel construction is illustrated in FIG. 8 wherein two solid planar members 81 and 82 are abutted together and offset axially relative to the shaft 76 of the first transport auger such that on rotation in the direction indicated by the arrow the leading edge is the longer of the two members on both sides of the shaft 76. It has been found that this construction provides the desired stiffness as well as the desired life when compared to a single thick piece of paddle material. For example, it has been found that two pieces of Mylar about 5 mils thick when placed together slightly offset provide better stiffness and life characteristics than a single piece of Mylar 10 mils thick. In an alternative embodiment shown in FIG. 9 the paddle wheel may comprise a plurality of fibers in a brush configuration.

In addition to exhibiting good fatigue life properties, it is important to note that the paddle wheel should be sufficiently rigid to provide a physical push on the developer through the transition zone between the first transport auger and the second transport auger without deforming and to store sufficient energy on rotation through the containment tube that upon release will provide sufficient energy to impact or jar the delivery end of the first transport auger. Accordingly, a positive assist is provided to drive the developer in a downward direction away from the first transport auger and toward the second transport auger as well as a slight shock force being provided as a result of the deformation and subsequent release of the paddle wheel by the delivery end of the first transport auger.

The anti-bridging device according to the present invention is a very simple, low cost anti-bridging device which does not depend upon gravity to transport toner from an upper auger to a lower auger The anti-bridging device effectively fills the lower auger by packing material into it enabling more consistent developer dispensing rate by preventing developer buildup over time in the auger flutes and the transition area between two augers which may be positioned at 90° angles.

The disclosure of the patent referred to herein is hereby specifically and totally incorporated herein by reference.

While the invention has been described with reference to specific embodiments, it will be apparent to those skilled in the art that many alternatives, modifications and variations may be made. For example, while the invention has been illustrated with reference to a printing machine wherein the electrostatic latent image is formed by optically scanning an original it will be appreciated that the electrostatic latent image may be created in other ways such as by a modulated beam of light from a laser beam. Furthermore, while the invention has been described as a developer transport apparatus it has equal capability as a toner transport apparatus. Accordingly, it is intended to embrace all such alternatives modifications as may fall within the spirit and scope of the appended claims.

I claim:

1. A developer transport apparatus comprising a rotatable developer auger to transport developer along its length from a developer entry end to a developer delivery end and transport means at said delivery end and underneath said auger to transport developer away from said delivery end, said developer auger being contained within a stationary cylindrical containment tube having a bottom and a top portion and extending the length of said auger, said tube being cut away at the bottom portion of the delivery end of said auger to permit toner to be delivered to said transport means, said developer auger having a developer anti-bridging device at the delivery end comprising a flexible paddle wheel mounted to the shaft of said auger and rotatable therewith, said flexible paddle wheel having a length greater than the diameter of said containment tube, whereby upon rotation of said auger said paddle wheel is first deformed by said top portion of said containment tube at the delivery end of said auger with the storage of energy therein and the subsequent release of energy when the deformed paddle wheel is rotated through the cut-away portion of the containment tube.

2. The transport apparatus of claim 1 wherein said transport means is a second rotatable developer transport auger.

3. The transport apparatus of claim 1 wherein said paddle wheel comprises first and second thin solid planar members in abutment and offset axially relative to each other, wherein the first member forms a first leading edge on a first side of the axis of rotation and the second member forms a second leading edge, which is diametrically opposed to the first leading edge, on a second side of the axis of rotation.

4. The transport apparatus of claim 3 wherein said members are fixedly mounted through a slot in the shaft of said auger.

5. The transport apparatus of claim 1 wherein said paddle wheel is a plurality of fibers in a brush configuration.

6. The transport apparatus of claim 3 wherein each of said member are about 5 mils thick.

7. The transport apparatus of claim 2 wherein said developer auger and said second rotatable developer transport auger intersect at about right angles.

* * * * *